（12）United States Patent
Nakano

(10) Patent No.: US 11,455,338 B2
(45) Date of Patent: Sep. 27, 2022

(54) QUESTION ANSWERING DEVICE, QUESTION ANSWERING METHOD, AND PROGRAM

(71) Applicant: TOYOTA JIDOSHA KABUSHIKI KAISHA, Toyota (JP)

(72) Inventor: Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/582,214

(22) Filed: Sep. 25, 2019

(65) Prior Publication Data

US 2020/0167390 A1 May 28, 2020

(30) Foreign Application Priority Data

Nov. 28, 2018 (JP) .............................. JP2018-221944

(51) Int. Cl.
*G10L 15/26* (2006.01)
*G06F 16/9032* (2019.01)
*G10L 15/22* (2006.01)

(52) U.S. Cl.
CPC ........ *G06F 16/90332* (2019.01); *G10L 15/22* (2013.01); *G10L 15/26* (2013.01)

(58) Field of Classification Search
None
See application file for complete search history.

(56) References Cited

U.S. PATENT DOCUMENTS

| 8,190,438 | B1* | 5/2012 | Nelissen ................. H04S 7/30 |
| | | | 704/274 |
| 9,769,297 | B2* | 9/2017 | Miller ................. B60R 11/0241 |
| 9,788,118 | B2* | 10/2017 | Bleacher ............. B60R 11/0217 |
| 2004/0267534 | A1* | 12/2004 | Beiermeister ........... G10L 15/26 |
| | | | 704/275 |
| 2005/0049002 | A1* | 3/2005 | White ..................... H04W 28/14 |
| | | | 455/556.1 |
| 2006/0053002 | A1* | 3/2006 | Visser ................. G10L 21/0272 |
| | | | 704/200 |
| 2008/0118074 | A1 | 5/2008 | Takada et al. |
| 2013/0041648 | A1* | 2/2013 | Osman ................... H04S 7/302 |
| | | | 381/300 |
| 2015/0220068 | A1* | 8/2015 | Goldman-Shenhar ....................... |
| | | | G05B 13/0265 |
| | | | 700/47 |

(Continued)

FOREIGN PATENT DOCUMENTS

| JP | 2006-107148 A | 4/2006 |
| JP | 2008-151766 A | 7/2008 |

(Continued)

*Primary Examiner* — Neeraj Sharma
(74) *Attorney, Agent, or Firm* — Oblon, McClelland, Maier & Neustadt, L.L.P.

(57) ABSTRACT

A question answering device includes: a reception unit configured to receive speech which is uttered in a vehicle; a generation unit configured to generate a character string which is indicated by the speech based on speech recognition; a first acquisition unit configured to acquire an answer to a question indicated by the character string; a second acquisition unit configured to acquire control information for localizing speech of the answer at a position associated with the answer in the vehicle; and an output unit configured to output the control information.

5 Claims, 8 Drawing Sheets

(56) References Cited

U.S. PATENT DOCUMENTS

| | | | |
|---|---|---|---|
| 2015/0280677 A1* | 10/2015 | Hui | H03G 7/007 |
| | | | 381/57 |
| 2016/0228771 A1* | 8/2016 | Watson | A63F 13/285 |
| 2017/0092295 A1* | 3/2017 | Talwar | G10L 15/19 |
| 2018/0190282 A1* | 7/2018 | Mohammad | G10L 25/84 |
| 2018/0288574 A1* | 10/2018 | DeLuca | H04W 4/027 |
| 2019/0036923 A1* | 1/2019 | Xuan | H04L 67/141 |
| 2019/0074001 A1* | 3/2019 | Lim | G10L 15/22 |
| 2019/0278552 A1* | 9/2019 | Lyren | H04S 7/303 |
| 2019/0362569 A1* | 11/2019 | Manoria | G07C 5/0816 |

FOREIGN PATENT DOCUMENTS

| | | |
|---|---|---|
| JP | 2014-11509 A | 1/2014 |
| JP | 2015-28566 A | 2/2015 |

\* cited by examiner

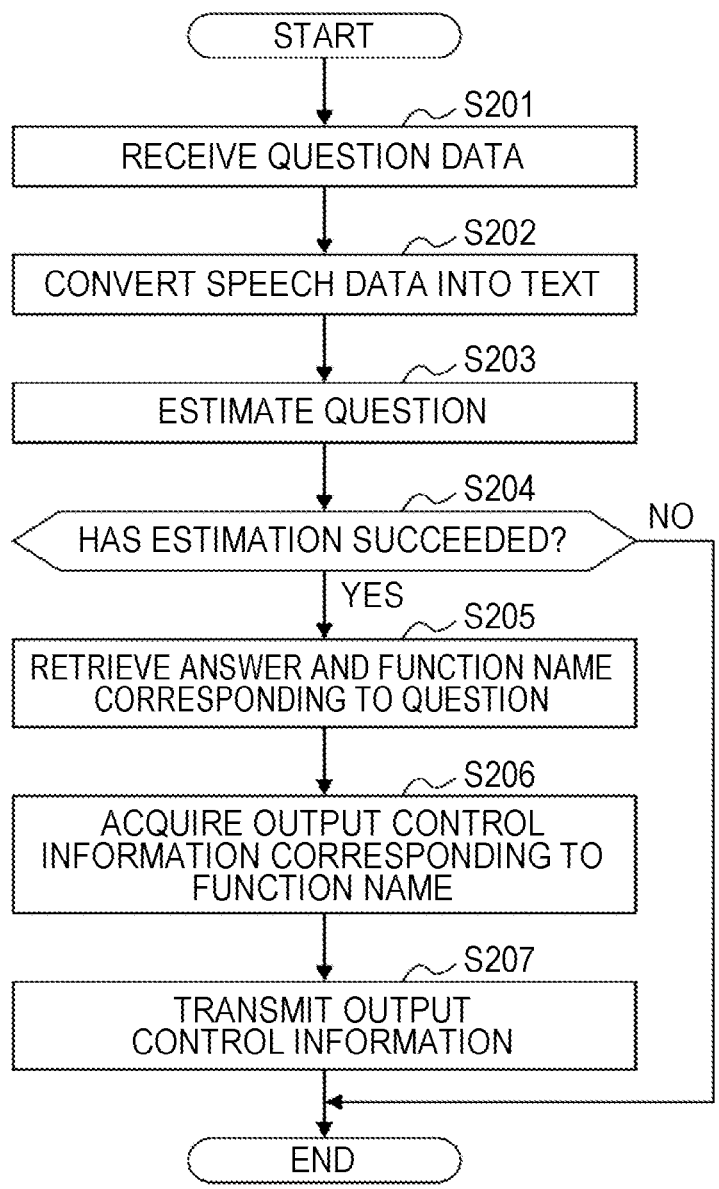

FIG. 6

| No | QUESTION | FUNCTION NAME | ANSWER |
|----|----------|---------------|--------|
| 1 | FUNCTION OUTLINE OF ETC | ETC CARD | YOU CAN ~ USING ETC CARD |
| 2 | POSITION OF ETC CARD SLOT | ETC CARD | ETC CARD SLOT IS LOCATED BELOW GLOVE BOX |
| 3 | AIR-CONDITIONER OPERATING METHOD | AIR-CONDITIONER | IF YOU WANT TO TURN ON AIR-CONDITIONER, ... |
| : | : | : | : |

| No | FUNCTION NAME | SPEECH CONTROL INFORMATION | DISPLAY CONTROL INFORMATION |
|----|---------------|----------------------------|------------------------------|
| 1 | ETC CARD | Left: 70%, right: 30% | ... |
| 2 | AIR-CONDITIONER | Left: 50%, right: 50% | ... |
| : | : | : | : |

| No | FUNCTION NAME | SPEECH CONTROL INFORMATION | DISPLAY CONTROL INFORMATION | INDICATOR LIGHTING COMMAND ID |
|---|---|---|---|---|
| 1 | ETC CARD | Left: 70%, right: 30% | ... | ... |
| 2 | AIR-CONDITIONER | Left: 50%, right: 50% | ... | ... |
| .. | .. | .. | .. | .. |

T2a, T2b, T2c

QUESTION ANSWERING DEVICE, QUESTION ANSWERING METHOD, AND PROGRAM

INCORPORATION BY REFERENCE

The disclosure of Japanese Patent Application No. 2018-221944 filed on Nov. 28, 2018 including the specification, drawings and abstract is incorporated herein by reference in its entirety.

BACKGROUND

1. Technical Field

The disclosure relates to a question answering device, a question answering method, and a program.

2. Description of Related Art

Techniques of outputting an answer to a question by speech from a speaker in a vehicle when a question is input to an onboard device by speech have been studied in the related art (for example, see Japanese Unexamined Patent Application Publication No. 2015-28566 (JP 2015-28566 A)).

SUMMARY

However, for example, when an answer to a question associated with an operation method of a certain function of a vehicle is output by speech, it may be difficult to express positions of switches or the like which are to be operated.

For example, when an answer, "a lever marked with an automobile and a meter on the right side below a steering wheel," is output by speech, an explanation for accurately delivering a position is complicated and a user may have difficulty in intuitive understanding.

For example, when an ETC card slot is output as an answer, output of speech of "below a glove box" is taken into consideration. In this case, an explanation is simple, but when a user does not know the term, glove box, the user cannot understand the answer and cannot conclusively ascertain a position associated with the answer.

The disclosure is for allowing a user to easily understand a position associated with an answer to a question in a vehicle.

According to an embodiment of the disclosure, there is provided a question answering device including: a reception unit configured to receive speech which is uttered in a vehicle; a generation unit configured to generate a character string which is indicated by the speech based on speech recognition; a first acquisition unit configured to acquire an answer to a question indicated by the character string; a second acquisition unit configured to acquire control information for localizing speech of the answer at a position associated with the answer in the vehicle; and an output unit configured to output the control information.

Accordingly, speech of an answer to a question is localized at a position associated with the answer by stereophonic sound.

Accordingly, it is possible to allow a user to easily understand a position associated with an answer to a question in a vehicle.

In a question answering device according to another embodiment of the disclosure, the second acquisition unit may be configured to acquire the control information when the question is a question about any position in the vehicle.

Accordingly, speech of an answer to a question about a position in a vehicle is localized at a position associated with the answer by stereophonic sound.

Accordingly, it is possible to allow a user to easily understand a position associated with an answer to a question in a vehicle.

In a question answering device according to another embodiment of the disclosure, the output unit may be configured to output a command to light up an indicator corresponding to a position associated with the answer.

Accordingly, an indicator in a vehicle corresponding to a position associated with an answer to a question is lit up.

Accordingly, it is possible to allow a user to easily understand a position associated with an answer to a question in a vehicle.

According to another aspect of the disclosure, there is provided a question answering method causing a computer to perform: a reception process of receiving speech which is uttered in a vehicle; a generation process of generating a character string which is indicated by the speech based on speech recognition; a first acquisition process of acquiring an answer to a question indicated by the character string; a second acquisition process of acquiring control information for localizing speech of the answer at a position associated with the answer in the vehicle; and an output process of outputting the control information.

Accordingly, speech of an answer to a question is localized at a position associated with the answer by stereophonic sound.

Accordingly, it is possible to allow a user to easily understand a position associated with an answer to a question in a vehicle.

According to another embodiment of the disclosure, there is provided a program causing a computer to perform: a reception process of receiving speech which is uttered in a vehicle; a generation process of generating a character string which is indicated by the speech based on speech recognition; a first acquisition process of acquiring an answer to a question indicated by the character string; a second acquisition process of acquiring control information for localizing speech of the answer at a position associated with the answer in the vehicle; and an output process of outputting the control information.

Accordingly, speech of an answer to a question is localized at a position associated with the answer by stereophonic sound.

Accordingly, it is possible to allow a user to easily understand a position associated with an answer to a question in a vehicle.

As a result, it is possible to allow a user to easily understand a position associated with an answer to a question in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart illustrating an example of a process routine which is performed by the server 10 according to the first embodiment;

FIG. 6 is a diagram illustrating an example of a configuration of a question-answer DB 17 according to the first embodiment;

FIG. 7 is a diagram illustrating an example of a configuration of an output control DB 18 according to the first embodiment;

FIG. 9 is a diagram illustrating an example of a configuration of an output control DB 18 according to a second embodiment.

DETAILED DESCRIPTION OF EMBODIMENTS

Figure 1:
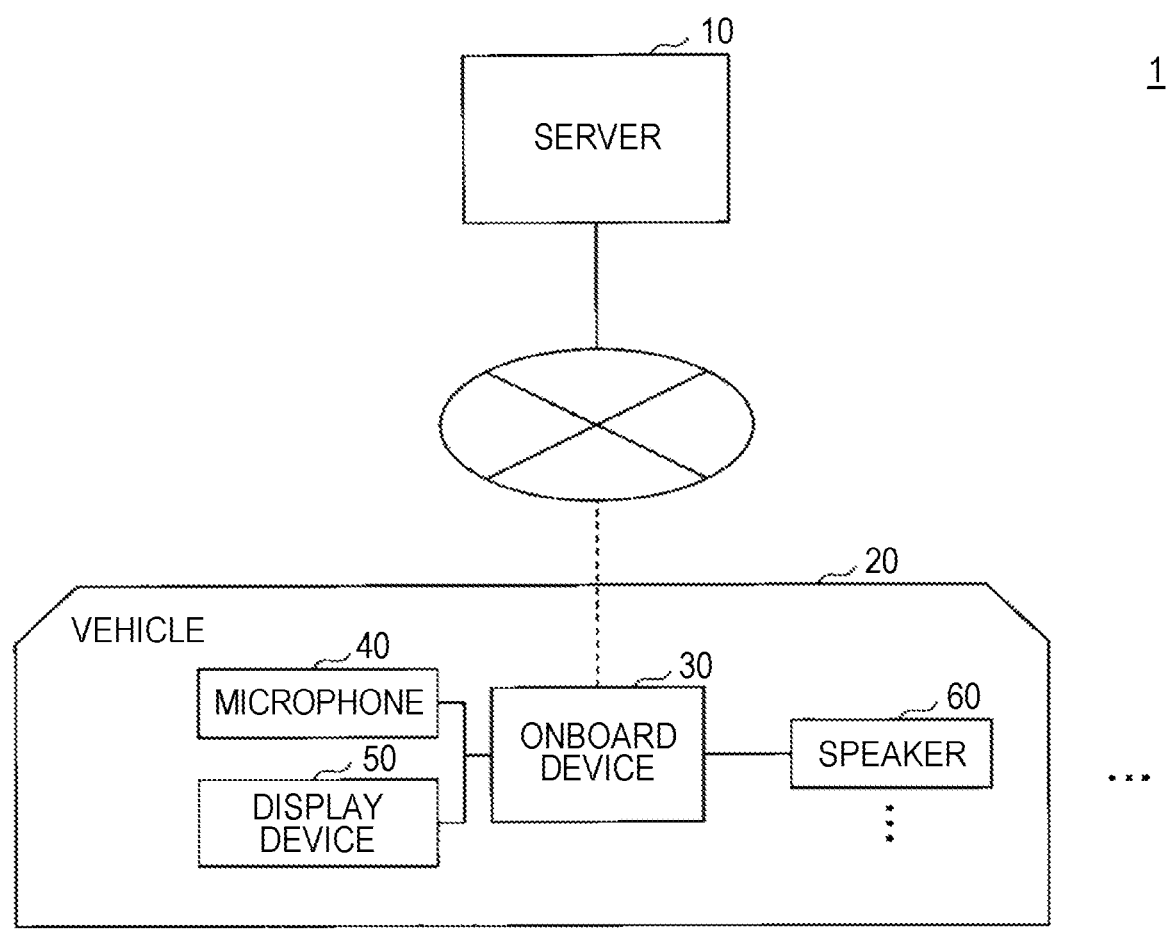
FIG. 1 is a diagram illustrating an example of a configuration of a question answering system according to a first embodiment.

Hereinafter, embodiments of the disclosure will be described with reference to the accompanying drawings. FIG. 1 is a diagram illustrating an example of a configuration of a question answering system according to a first embodiment. In FIG. 1, the question answering system includes a server 10 and one or more vehicles 20.

Each vehicle 20 is, for example, an automobile and includes an onboard device 30, a microphone 40, a display device 50, and two or more speakers 60. The microphone 40 is a device that converts speech into an electrical signal (hereinafter referred to as a "speech signal"). In this embodiment, the microphone 40 is used to collect speech of a question about a function of the vehicle 20 which is uttered by an occupant of the vehicle 20 (such as a driver or a fellow passenger who is hereinafter referred to as a "user") in the vehicle 20. The display device 50 is, for example, a liquid crystal display. In this embodiment, the display device 50 is used to display information associated with an answer to a question. The speaker 60 is a device that outputs speech based on an electrical signal. In this embodiment, the speaker 60 is used to output speech indicating an answer to a question. An answer is output by stereophonic sound using the two or more speakers 60. By using stereophonic sound, speech indicating an answer is localized at a position associated with an answer in the vehicle 20. In other words, speech of an answer is output in order to be heard by a user from the direction of the position.

The onboard device 30 is a device that has an information processing function and a communication function and is connected to the server 10 via a network N1 including a mobile communication network which is a radio communication network with a plurality of base stations as terminals or the Internet. In this embodiment, the onboard device 30 transmits data (hereinafter referred to as "question data") including digital data (hereinafter referred to as "speech data") in which a speech signal output from the microphone 40 is recorded and information (hereinafter referred to as "vehicle model information") indicating a vehicle model of the vehicle 20 to the server 10. The onboard device 30 receives information (hereinafter referred to as "output control information") indicating a control method of an output of an answer to a question which is returned from the server 10. The output control information includes output control information on display output and output control information on speech output. The onboard device 30 controls display of information associated with an answer on the display device 50 based on the output control information on display output (hereinafter referred to as "display control information"). The onboard device 30 controls output of speech indicating an answer by stereophonic sound from the speakers 60 based on the output control information on speech output (hereinafter referred to as "speech control information").

The server 10 is one or more computers that acquire an answer to a question indicated by the question data transmitted from the onboard device 30 and return output control information on the answer to the onboard device 30.

Figure 2:
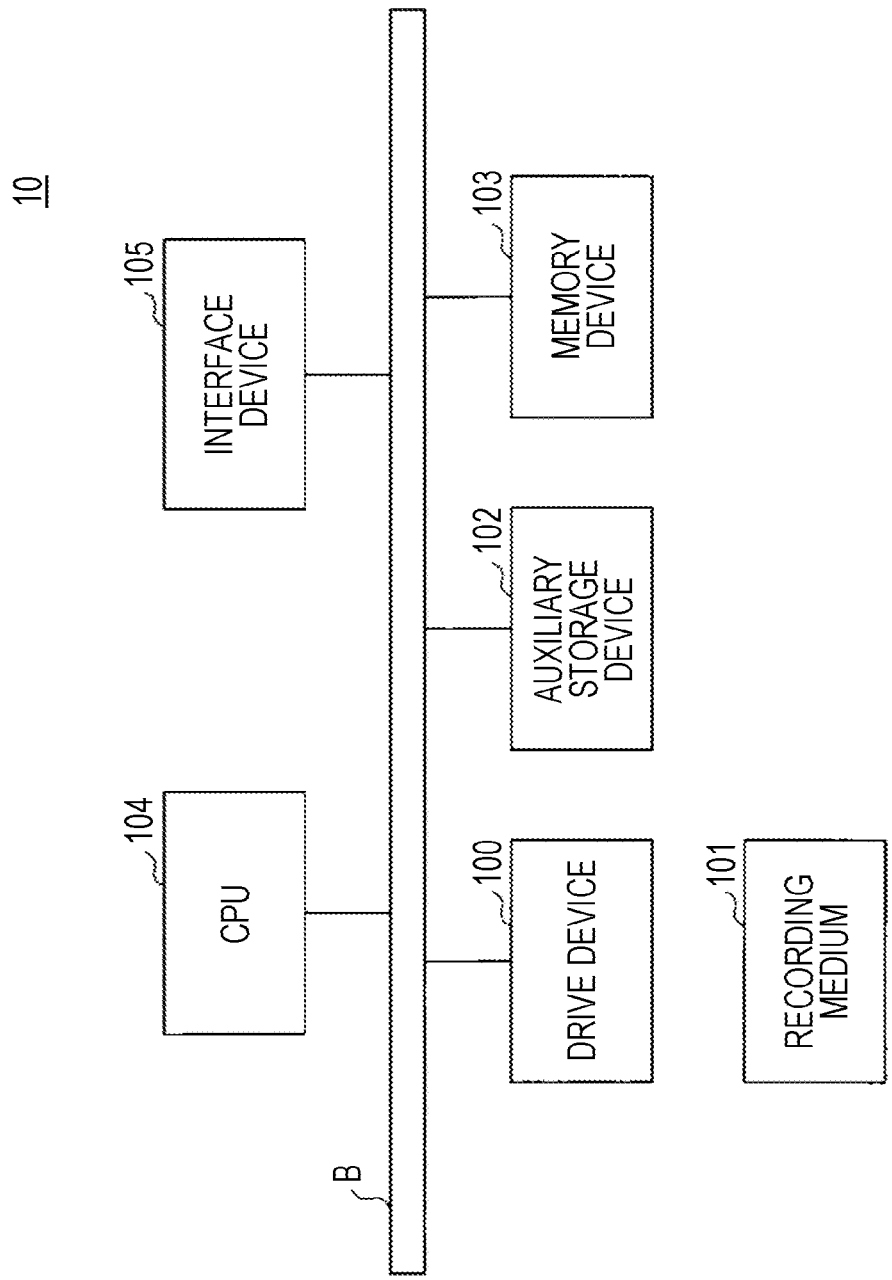
FIG. 2 is a diagram illustrating an example of a hardware configuration of a server 10 according to the first embodiment.

FIG. 2 is a diagram illustrating an example of a hardware configuration of the server 10 according to the first embodiment. The server 10 illustrated in FIG. 2 includes a drive device 100, an auxiliary storage device 102, a memory device 103, a central processing unit (CPU) 104, and an interface device 105 which are connected to each other via a bus B.

A program that performs processes in the server 10 is provided by a recording medium 101 such as a CD-ROM. When a recording medium 101 having a program recorded thereon is set in the drive device 100, the program is installed in the auxiliary storage device 102 from the recording medium 101 via the drive device 100. Here, installation of the program does not need to be performed using the recording medium 101, and the program may be downloaded from another computer via a network. The auxiliary storage device 102 stores the installed program and also stores necessary files, data, and the like.

When an instruction to start a program is issued, the memory device 103 reads the program from the auxiliary storage device 102 and stores the read program therein. The CPU 104 performs functions associated with the server 10 in accordance with the program stored in the memory device 103. The interface device 105 is used as an interface for connection to a network.

Figure 3:
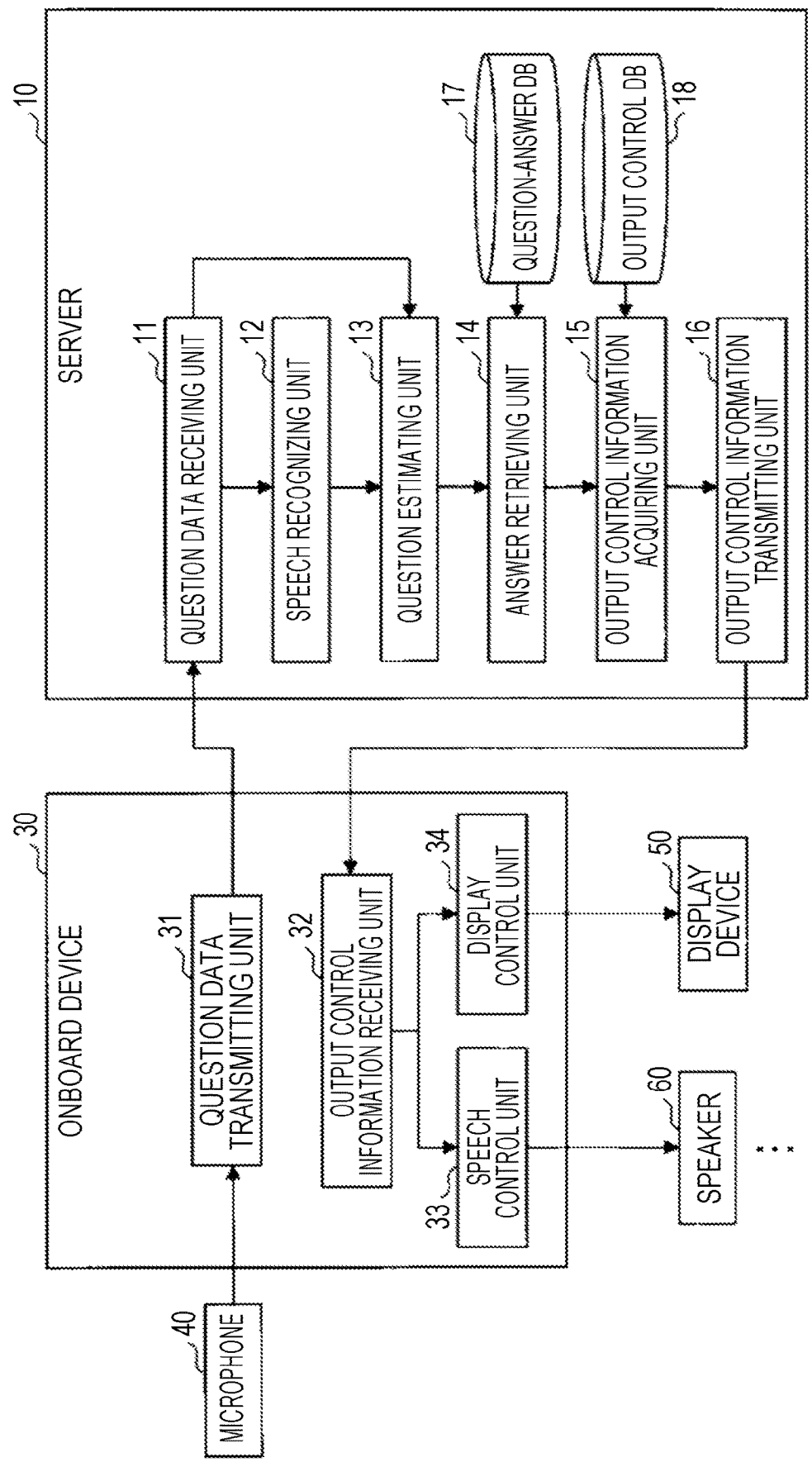
FIG. 3 is a diagram illustrating an example of a functional configuration of an onboard device 30 and the server 10 according to the first embodiment.

FIG. 3 is a diagram illustrating an example of a functional configuration of the onboard device 30 and the server 10 according to the first embodiment. In FIG. 3, the onboard device 30 includes a question data transmitting unit 31, an output control information receiving unit 32, a speech control unit 33, and a display control unit 34. These units are embodied by causing the CPU of the onboard device 30 to execute one or more programs installed in the onboard device 30.

The question data transmitting unit 31 generates speech data based on a speech signal which is output from the microphone 40 and transmits question data including the speech data and vehicle model information to the server 10.

The output control information receiving unit 32 receives output control information which is output from the server 10 in response to question data. The output control information receiving unit 32 inputs speech control information out of the output control information to the speech control unit 33 and inputs display control information to the display control unit 34.

The speech control unit 33 controls output of speech indicating an answer by stereophonic sound from a plurality of speakers 60 based on the speech control information.

The display control unit 34 controls display of information on an answer on the display device 50 based on the display control information.

On the other hand, the server 10 includes a question data receiving unit 11, a speech recognizing unit 12, a question estimating unit 13, an answer retrieving unit 14, an output control information acquiring unit 15, and an output control information transmitting unit 16. These units are embodied by causing the CPU 104 to execute one or more programs installed in the server 10. The server 10 utilizes databases (a storage unit) Y such as a question-answer DB 17 and an output control DB 18. These databases can be embodied, for example, by the auxiliary storage device 102 or a storage device or the like that can be connected to the server 10 via a network.

The question data receiving unit 11 receives question data which is transmitted from the onboard device 30. The speech recognizing unit 12 performs speech recognition on speech which is indicated by speech data included in the question data and generates a character string (text data) indicated by the speech.

The question estimating unit 13 estimates (an intention of) a question indicated by details of the text data. Specifically, the question estimating unit 13 estimates which of a plurality of supposed questions details of the text data are.

The answer retrieving unit 14 acquires an answer to the question which is estimated by the question estimating unit 13 and a name of a function (a function associated with the vehicle 20) (hereinafter referred to as a "function name") associated with the answer from the question-answer DB 17. That is, answers and function names are stored in correlation with a plurality of supposed questions in the question-answer DB 17.

The output control information acquiring unit 15 acquires output control information on the function name which is acquired by the answer retrieving unit 14 from the output control DB 18. That is, output control information (speech control information and display control information) are stored for each function name in the output control DB 18.

The output control information transmitting unit 16 transmits the output control information acquired by the output control information acquiring unit 15 to the onboard device 30 which is a transmission source of the question data.

Figure 4:
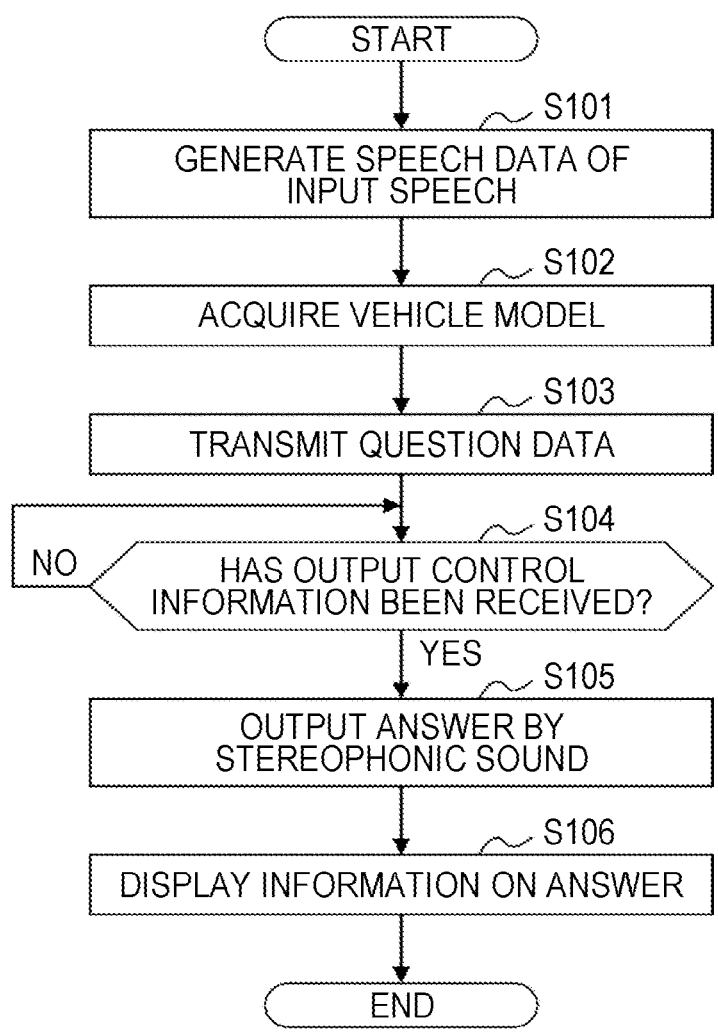
FIG. 4 is a flowchart illustrating an example of a process routine which is performed by the onboard device 30 according to the first embodiment.

Process routines which are performed by the onboard device 30 and the server 10 will be described below. FIG. 4 is a flowchart illustrating an example of a process routine which is performed by the onboard device 30 according to the first embodiment.

When speech which is uttered by a user is input via the microphone 40, the question data transmitting unit 31 generates speech data having the speech recorded thereon (S101). The processes of step S101 and steps subsequent thereto may be performed on all uttered speech or the processes of step S101 and steps subsequent thereto may be performed on speech uttered after a user has performed a predetermined operation (for example, pressing a predetermined button) in the vehicle 20. In the former, details of the speech cannot necessarily be said to be a question. The question data transmitting unit 31 may recognize speech from start of utterance to pause of utterance over a predetermined time or more as one piece of uttered speech.

Subsequently, the question data transmitting unit 31 acquires vehicle model information of the vehicle 20 (S102). For example, the vehicle model information may be acquired from a nonvolatile memory in the onboard device 30 or the vehicle 20.

Subsequently, the question data transmitting unit 31 transmit question data including speech data generated in step S101 and vehicle model information acquired in step S102 to the server 10 (S103). Thereafter, the output control information receiving unit 32 waits for receiving output control information which is returned from the server 10 (S104).

When the output control information receiving unit 32 receives output control information (YES in S104), the speech control unit 33 controls output of speech indicating an answer by stereophonic sound using a plurality of speakers 60 based on speech control information which is included in the output control information (S105).

Subsequently or in parallel with step S105, the display control unit 34 displays information associated with the answer on the display device 50 based on display control information which is included in the output control information (S106).

FIG. 5 is a flowchart illustrating an example of a process routine which is performed by the server 10 according to the first embodiment.

When the question data receiving unit 11 receives question data which is transmitted from the onboard device 30 in step S103 of FIG. 4 (S201), the speech recognizing unit 12 performs speech recognition on speech indicated by speech data included in the question data and converts the speech into text data (S202). That is, text data indicating the speech is generated.

Subsequently, the question estimating unit 13 estimates which of a plurality of questions stored in the question-answer DB 17 details of the text data are (S203). For example, a question estimator may be generated using machine learning in advance and the question estimating unit 13 may estimate the question using the question estimator. In this case, the question estimator may be generated for each vehicle model. In this case, the question estimating unit 13 may estimate a question using the question estimator corresponding to the vehicle model indicated by the vehicle model information included in the question data. Alternatively, the question estimating unit 13 may calculate a degree of similarity between character strings of the text data and questions stored in the question-answer DB 17 and set a question having the highest degree of similarity out of the questions having a degree of similarity equal to or higher than a threshold value as an estimation result. Known techniques can be used to calculate a degree of similarity between character strings.

When estimation of a question has failed, that is, when a question cannot be specified (NO in S204), the process routine illustrated in FIG. 5 ends. Alternatively, the output control information transmitting unit 16 may return an answer indicating that a question is not clear to the onboard device 30. For example, when a content of text data is a simple conversation, a non-supposed question, or the like in the vehicle 20, estimation of a question fails.

When estimation of a question has succeeded, that is, when a question can be specified (YES in S204), the answer retrieving unit 14 retrieves an answer and a function name corresponding to the specified question (hereinafter referred to as a "target question") from the question-answer DB 17 (S205).

FIG. 6 is a diagram illustrating an example of a configuration of the question-answer DB 17 according to the first embodiment. As illustrated in FIG. 6, question-answer tables T1a, T1b, and T1c, and the like (hereinafter referred to as "question-answer tables T1" when they are not distinguished from each other) are stored for each vehicle model in the question-answer DB 17. Three question-answer tables T1 are illustrated in FIG. 6, but the number of question-answer tables T1 may increase or decrease depending on the number of vehicle models.

In each question-answer table T1, a function name and an answer are stored in correlation with each question. A function name is a name of a function associated with an answer to a question. An answer is an answer to a question.

Accordingly, in step S205, an answer (hereinafter referred to as a "target answer") and a function name (hereinafter referred to as a "target function name") corresponding to a target question are retrieved (acquired) from the question-answer table T1 corresponding to the vehicle model indicated by the vehicle model information included in question data.

Questions which are registered in each question-answer table T1 may be limited to questions about one position in the vehicle 20 such as a part or a position in the vehicle 20. In this case, since questions about one position in the vehicle 20 are estimated from text data in step S203, this process routine is performed when a target question is a question about one position in the vehicle 20 after step S205.

Subsequently, the output control information acquiring unit 15 acquires output control information corresponding to a target function name from the output control DB 18 (S206).

FIG. 7 is a diagram illustrating an example of a configuration of the output control DB 18 according to the first embodiment. As illustrated in FIG. 7, output control tables T2a, T2b, and T2c, and the like (hereinafter referred to as "output control tables T2" when they are not distinguished from each other) are stored in correlation with vehicle models in the output control DB 18. Three output control tables T2 are illustrated in FIG. 7, but the number of output control tables T2 may increase or decrease depending on the number of vehicle models.

In each output control table T2, speech control information and display control information are stored in correlation with the function names. The speech control information is information indicating details of control of a speech output from the speakers 60 for localizing speech at a position (a position in the vehicle 20) of a function associated with the function name. The display control information is information indicating a function associated with the function name, for example, using text or an image. In FIG. 7, a ratio of sound volumes from right and left speakers 60 is illustrated as speech control information on the premise that two speakers 60 are mounted in the vehicle 20, but information of another format may be used as the speech control information as long as it is information for realizing stereophonic sound. For example, a coordinate value indicating a specific position in the vehicle 20 may be used as speech control information or information indicating one area when the inside of the vehicle 20 is divided into a plurality of areas may be used as speech control information.

Accordingly, in step S206, speech control information and display control information corresponding to the target function name are acquired from the output control table T2 corresponding to the vehicle model indicated by the vehicle model information included in the question data.

In this embodiment, the type, the number, and the arrangement positions, and the like of the speakers 60 (hereinafter referred to as a "speaker configuration") varies depending on the vehicle models, but when the speaker configuration varies depending on classifications different from the vehicle model, the output control table T2 may be prepared for each of the classification. In this case, information including the classification has only to be included in the question data.

Subsequently, the output control information transmitting unit 16 transmits a target answer and speech control information and display control information acquired in step S206 to the onboard device 30 which is a transmission source of the question data (S207). The output control information transmitting unit 16 may generate speech data for causing the target answer to be output from the speakers 60 in details corresponding to the speech control information and transmit the speech data instead of the speech control information to the onboard device 30.

In step S105 of FIG. 4, speech indicating the target answer is output by stereophonic sound using a plurality of speakers 60 based on the speech control information or the speech data. As a result, the speech is localized at a position associated with the target answer.

Figure 8:
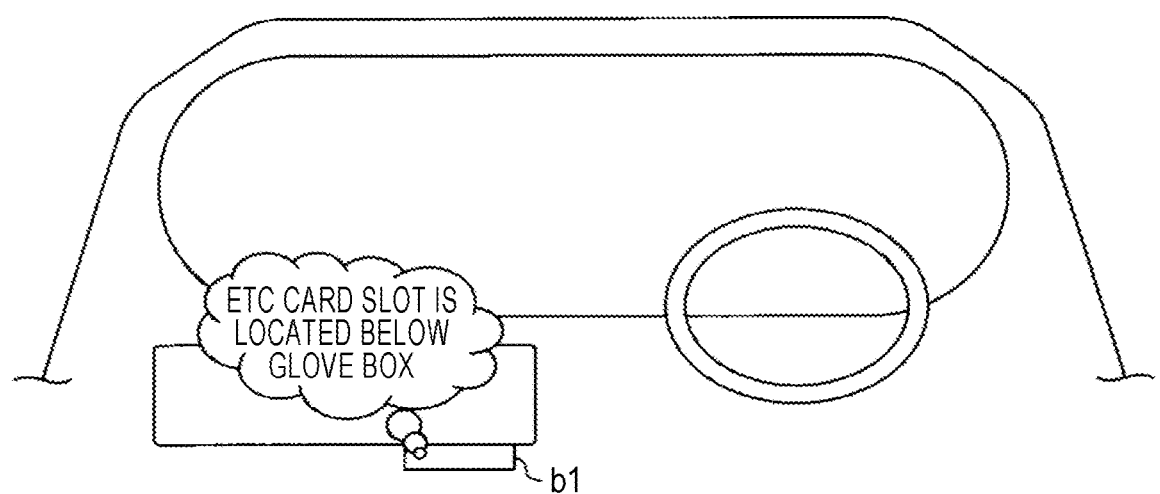
FIG. 8 is a diagram illustrating an example in which speech is localized at a position associated with an answer.

FIG. 8 is a diagram illustrating an example in which speech is localized at a position associated with an answer. In FIG. 8, an example in which speech of a target answer is localized at the lower side of a glove box b1 is illustrated. In this case, a user recognizes an output direction of speech indicating the answer "an ETC card is located below the glove box" as a direction of the lower side of the glove box b1. As a result, the user can intuitively understand the position associated with the answer.

As described above, according to the first embodiment, speech of an answer to a question is localized at a position of a function associated with the answer by stereophonic sound. Accordingly, the position can be intuitively delivered to a user. As a result, it is possible to allow a user to easily understand a position associated with an answer to a question in the vehicle 20.

A second embodiment will be described below. In the second embodiment, differences from the first embodiment will be mainly described. Accordingly, points which are not particularly mentioned may be the same as in the first embodiment.

The second embodiment is different from the first embodiment in the configuration of the output control DB 18. FIG. 9 is a diagram illustrating an example of the configuration of the output control DB 18 according to the second embodiment.

In FIG. 9, each output control table T2 additionally stores an indicator lighting command ID in correlation with the function name. The indicator lighting command ID is identification information for a command to light up a specific indicator in the vehicle 20, and a lighting target or a lighting method varies depending on the indicator lighting command ID.

Accordingly, in step S206 of FIG. 5, the output control information acquiring unit 15 additionally acquires an indicator lighting command ID corresponding to a target function name from the output control table T2 corresponding to the vehicle model indicated by the vehicle model information included in the question data.

In step S207, a transmission unit newly transmits the indicator lighting command ID.

In step S106 of FIG. 4, the display control unit 34 lights up an indicator (for example, an LED lamp) in accordance with the indicator lighting command ID received from the server 10. As a result, an indicator at the position corresponding to the answer is lit up.

As described above, according to the second embodiment, an indicator at a position associated with an answer is lit up. As a result, it is possible to allow a user to visually understand the position.

In the second embodiment, a system in which speech is not output from the speakers 60 may be employed. In this case, speech control information may not be stored in the output control DB 18.

In the above-mentioned embodiments, the server 10 is an example of a question answering device. Here, the functions of the server 10 in the embodiments may be provided in the vehicle 20 (the onboard device 30). In this case, the onboard device 30 is an example of a question answering device. The question data receiving unit 11 is an example of a reception unit. The speech recognizing unit 12 is an example of a generation unit. The answer retrieving unit 14 is an example of a first acquisition unit. The output control information acquiring unit 15 is an example of a second acquisition unit. The output control information transmitting unit 16 is an example of an output unit.

While embodiments of the disclosure have been described above in detail, the disclosure is not limited to the embodiments and can be modified and changed in various forms without departing from the gist of the disclosure described in the appended claims.

What is claimed is:

1. A question answering device comprising:
    a speaker that receives speech which is uttered in a vehicle;
    a generation processor that generates a character string which is indicated by the speech based on speech recognition;
    a first acquisition processor that acquires a target answer to a question indicated by the character string;
    a second acquisition processor that acquires control information for localizing speech of the target answer at a coordinate value indicating a specific position of an onboard device in the vehicle that corresponds with the target answer; and
    a speaker that outputs the target answer by stereophonic sound using the control information.

2. The question answering device according to claim 1, wherein the second acquisition processor is configured to acquire the control information when the question is a question about any position in the vehicle.

3. The question answering device according to claim 1, further comprising an output processor that outputs a command to light up an indicator corresponding to a position associated with the target answer.

4. A question answering method causing a computer to perform:
    a reception process of receiving speech which is uttered in a vehicle;
    a generation process of generating a character string which is indicated by the speech based on speech recognition;
    a first acquisition process of acquiring a target answer to a question indicated by the character string;
    a second acquisition process of acquiring control information for localizing speech of the target answer at a coordinate value indicating a specific position of an onboard device in the vehicle that corresponds with the target answer; and
    an output process of outputting the target answer by stereophonic sound using the control information.

5. A non-transitory computer-readable storage medium storing instructions which, when executed by at least one processor, cause the at least one processor to perform operations comprising:
    a reception process of receiving speech which is uttered in a vehicle;
    a generation process of generating a character string which is indicated by the speech based on speech recognition;
    a first acquisition process of acquiring a target answer to a question indicated by the character string;
    a second acquisition process of acquiring control information for localizing speech of the target answer at a coordinate value indicating a specific position of an onboard device in the vehicle that corresponds with the target answer; and
    an output process of outputting the target answer by stereophonic sound using the control information.

* * * * *